UNITED STATES PATENT OFFICE.

ROBERTO EGGENHOFFNER, OF GENOA, ITALY.

MAGNESIA CEMENT.

1,000,386.     Specification of Letters Patent.     Patented Aug. 15, 1911.

No Drawing.     Application filed March 29, 1909. Serial No. 486,537.

*To all whom it may concern:*

Be it known that I, ROBERTO EGGENHOFFNER, a subject of the Emperor of Austria-Hungary, residing at Genoa, Italy, have invented certain new and useful Improvements in the Manufacture of Magnesia Cement, of which the following is a specification.

The present invention relates to the manufacture of magnesia cement, and to the products obtained thereby.

The invention has for its basis the mixing of a certain number of parts by molecular weight of oxid of magnesium with one part by molecular weight of a chemical product obtained by the combination of one molecule of magnesium chlorid with one molecule of magnesium oxid and one molecule of water. This latter product will hereinafter be called ortho-oxychlorid of magnesium.

The magnesia cement constituting the present invention requires the preceding production of the ortho-oxychlorid of magnesium, for which production the cheapest raw materials can be employed.

The principal basis of the present invention, established by theoretical deductions and by repeated experiments, consists in the recognition of the fact, that it is not the chlorid of magnesium, or its solution, which solidifies and hardens, when mixed with oxid of magnesium, but that it is the above mentioned combination of one molecule of magnesium chlorid with one molecule of magnesium oxid, that is to say the above mentioned ortho-oxychlorid of magnesium which solidifies with magnesium oxid in the presence of water.

Chlorid of magnesium cannot be calcined when it is to be mixed in anhydrous condition with the oxid and to form a cement; it is however easy to calcine the product resulting from the combination of one molecule of chlorid and one molecule of oxid and to mix this product during the process of grinding, or before or after the same, with the oxid of magnesium in order to obtain the magnesia cement.

The magnesia cement constituting the present invention can be employed alone, or it can be mixed with wood sawdust, with detritus of minerals, with asbestos, or with any other convenient materials, such as coloring substances.

For the production of the ortho-oxychlorid of magnesium, the principal systems that I propose are the following:—

(*a*) Bringing magnesium oxid if possible as soon as calcined and while still warm, into contact with anhydrous hydrochloric acid gas, the reaction being as follows:—

$$2MgO + 2HCl = Mg_2OCl_2 + H_2O.$$

This method is the least advisable because it will not consistently yield a uniform product.

(*b*) Only partly calcining magnesium chlorid in the open air, so as to partially decompose it, the process being conducted with accurate weighing until the following formulæ are successively obtained:

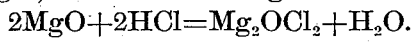
$$16(MgCl_2 + 6H_2O) = (8Mg_2Cl_4 + 96H_2O) =$$
$$(8Mg_2OH_2Cl_4 + 88H_2O)$$

when by calcining pure hydrochloric acid and hydrochloric acid at 20% will be developed, that is to say:

$$6HCl + 10(HCl = 8H_2O)$$

yielding as resulting residuum $$8(Mg_2OCl_2 + H_2O).$$

This system will be found convenient and practicable wherever magnesium chlorid is found native in considerable quantities.

In the great majority of cases, it will be preferable to proceed according to one of the three following methods, taking for a base the production of ortho-oxychlorid from magnesium oxid and chlorid of magnesium, substituting respectively for the latter a solution of hydrochloric acid and replacing in such cases a part of the magnesium oxid with carbonate of magnesium.

The following formulæ will be had with the respective proportional molecular weights:

Taking magnesium oxid (MgO)
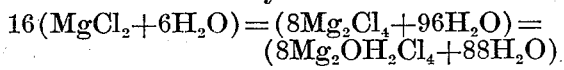
molecular weight _____ 40.36
And a solution of chlorid of
magnesium at 33.6° Baumé
$MgCl_2.6H_2O$ _____ 203.38
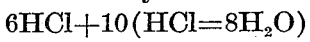
$5H_2O$ _____ 90.10
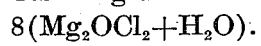

Total _____ 333.84

Or taking:

| | p.w. |
|---|---|
| Magnesium oxid: 2 MgO | 80.72 |
| A solution of hydrochloric acid at 18.4° Baumé viz. 28.81%, $2HCl.10H_2O$ | 253.12 |
| Total p.w. | 333.84 |

Taking again:

| | |
|---|---|
| Magnesium oxid MgO | 40.36 |
| Carbonate of magnesium $MgCO_3$ | 84.36 |
| And solution of hydrochloric acid at 18.4° Baumé viz. 28.81%, $2HCl.10H_2O$ | 253.12 |
| | 377.84 |
| From this we have to deduct the carbonic acid ($CO_2$) which is generated, viz. | 44 |
| And we have the total p.w. | 333.84 |

The common total resulting from the above treatment represents the hydrated ortho-oxychlorid having the formula $$Mg_2OCl_2 + 11H_2O.$$

In order to obtain this product according to the above treatment it will be necessary to keep the mixture in continuous movement until it will be uniformly solidified, at times heating the mixture in order to hasten the combination, whereby the oxid depositing on the bottom shall be prevented from combining with a minor quantity of chlorid leaving free a part of the solution. At all events, either the solution of the chlorid or of the acid may be more or less strong; the strength need only be taken into account in the calcining; it will also be necessary to take into account the impurities contained in the oxid or carbonate of magnesium. The cost of production in these cases is very slight. By calcining therefore the hydrated ortho-oxychlorid pure ortho-oxychlorid will be obtained as follows:

| | p.w. |
|---|---|
| Hydrated ortho-oxychlorid, $Mg_2OCl_2 11H_2O$ | 333.84 |
| Less water, $10H_2O$ | 180.20 |
| Remains pure ortho-oxychlorid, $Mg_2OCl_2 + H_2O$ | 153.64 |

It will now suffice to accurately mix this quantity of final ground product, which represents the molecular weight, with a multiple of 40.36 (molecular weight) of magnesium oxid, according to the degree of consolidation, of resistance and of hardness of the cement which it is desired to obtain.

The aforesaid formulæ refer always to the substances in a pure state, consequently if the materials employed contain impurities, as stated, the same should be taken into account in determining the parts by weight.

Now that I have described the processes for the production of the ortho-oxychlorid of magnesium, I will now proceed to give the formulæ of two kinds of magnesia cement. These are called "litosilo" magnesia cement and "orthochlor" magnesia cement. If 153.64 parts of pure ortho-oxychlorid of magnesium are mixed with 7×40.36=282.52 parts of magnesium oxid, 436.16 parts of anhydrous "litosilo" magnesia cement are obtained, to which, it may be added in forming the paste, at the maximum, 26×18.02=468.53 parts of water. If, on the contrary, 153.64 parts of pure ortho-oxychlorid are mixed with 3×40.36=121.08 parts of magnesium oxid, 274.72 parts of anhydrous "orthochlor" magnesia cement are obtained to which may be added, at the maximum, 18×18.02=324.36 parts of water.

We have dealt hereabove with numbers proportional to the molecular weight, in order to facilitate the working of the chemical equations. The "orthochlor" as compared with "litosilo" is cheaper, besides which it presents the further advantages of being less dense, and when agglomerated with sawdust and the like it yields a lighter and more homogeneous product, which is also more resisting and flexible, and absorbs sound better.

The magnesia cement according to the present invention may be placed on the market in a state of purity or mixed with wood or with asbestos and other mineral detritus.

The cements produced according to the above mentioned formulæ may be called anhydrous "litosilo" and anhydrous "orthochlor" according to the proportion of magnesium oxid employed, as was stated above. These cements may be used immediately after their manufacture or the oxychlorid and the other ingredient may be preserved dry for a long time and transported when by mixing them with water only, a product is obtained ready to be spread and made use of, identical with that obtained when the manufacture is complete at one operation.

When the magnesia cement of the present invention especially that called "orthochlor" is mixed with mineral detritus or alone, it may serve for a cement in lining cisterns, terraces, reinforced cement structures such as balconies and the like; mixed with sawdust it serves admirably for use in building the holds and compartments of ships, as a substitute for wood, retaining the qualities of the latter, except its combustibility. It is likewise applicable for covering roofs, pavements, floors, walls and the like and in fortifications. The above described materials likewise find an advantageous application in the construction of those works which are subject to great shocks such as the blocks of cement protecting fixed or turning armored turrets, casemates, batteries and armor plates. These cement materials may be used separately, especially in the cases of building up bulwarks or in a state of combination with iron supports, such as bars, rods, or expanded metal thus obtaining a product which opposes a maximum of resistance both to penetration and to flexion. This latter characteristic permits of its use (always when strengthened internally by expanded metal bars or rods) also in the construction of decks directly on the girders, thus partially or entirely substituting wood and iron.

Whatever mixtures may be obtained according to the aforesaid indications, the relative cements may be placed on the market with or without the addition of a definite quantity of wood sawdust, coloring earths, asbestos, mineral detritus, and the like, according to the requirements of the uses to which they are to be put; and each of the aforesaid products will require a different quantity necessary to form paste of the required consistency.

I claim:

1. Magnesia cement consisting of a mixture containing $x$ parts of molecular weight of magnesium oxid and one part of molecular weight of pure magnesium ortho-oxychlorid, according to the formula:

$$Mg_2OCl_2.H_2O+(MgO)_x,$$

$x$ being a variable number.

2. Magnesia cement consisting of a mixture containing $x$ parts of molecular weight of magnesium oxid and one part of molecular weight of a magnesium oxychlorid which latter is formed by the combination of one molecule of magnesium chlorid with one molecule of magnesium oxid and one molecule of water according to the formula:

$$Mg_2OCl_2.H_2O,$$

$x$ being a variable number.

3. Magnesia cement consisting of a mixture containing 7 parts of molecular weight of magnesium oxid and one part of molecular weight of pure magnesium ortho-oxychlorid, according to the formula:

$$Mg_2OCl_2.H_2O+7MgO.$$

In testimony whereof I have signed my name in this specification in the presence of two witnesses.

ROBERTO EGGENHOFFNER.

Witnesses:
   PIO RINALVINIL,
   ANGELO BORAGUM.